United States Patent [19]

Lee et al.

[11] Patent Number: 5,678,901
[45] Date of Patent: Oct. 21, 1997

[54] ANTI-SKID BRAKE CONTROL SYSTEM HAVING SPOOL VALVES

[75] Inventors: Jong Wook Lee, Seoul; Sang Cheol Lee; Cha Hwan Kim, both of Kyungki-do; Young Il Kim, Seoul, all of Rep. of Korea

[73] Assignee: Mando Machinery, Kyungki-do, Rep. of Korea

[21] Appl. No.: 384,960

[22] Filed: Feb. 7, 1995

[30] Foreign Application Priority Data

Mar. 22, 1994 [KR] Rep. of Korea ............... 5747

[51] Int. Cl.6 ................................................. B60T 8/32
[52] U.S. Cl. ................................. 303/117.1; 303/116.1
[58] Field of Search ....................... 303/10, 11, 116.1, 303/116.2, 117.1, 113.1, 113.5, DIG. 1, DIG. 2, 84.2, 901

[56] References Cited

U.S. PATENT DOCUMENTS

| 4,986,612 | 1/1991 | Arkawa | 303/116.1 |
| 5,385,395 | 1/1995 | Volz | 303/116.1 |
| 5,397,175 | 3/1995 | Matsunaga et al. | 303/117.1 |
| 5,403,078 | 4/1995 | Farr | 303/117.1 |

FOREIGN PATENT DOCUMENTS

| 4306801 | 9/1993 | Germany | 303/117.1 |

*Primary Examiner*—Matthew C. Graham
*Attorney, Agent, or Firm*—Robert B. Hughes; Hughes, Multer & Schacht

[57] ABSTRACT

An anti-skid brake system to supply brake fluid to first and second wheel brakes of an automobile. There are first and second control valves to receive brake fluid from a master cylinder, and first and second bypass valves to receive the bypass flow from the first and second control valves, respectively. A pump receives the bypass flow from the bypass valves in an anti-lock mode and recirculates the brake fluid in the system. There is a release valve that is responsive to fluid pressure levels of the first and second control valves to selectively connect the first and second control valves to the master cylinder, in a manner that with one of the control valves in its anti-lock mode and the other control valve in its normal operating mode, the pump delivers brake fluid toward the control valve which is isolated by the release valve.

14 Claims, 7 Drawing Sheets

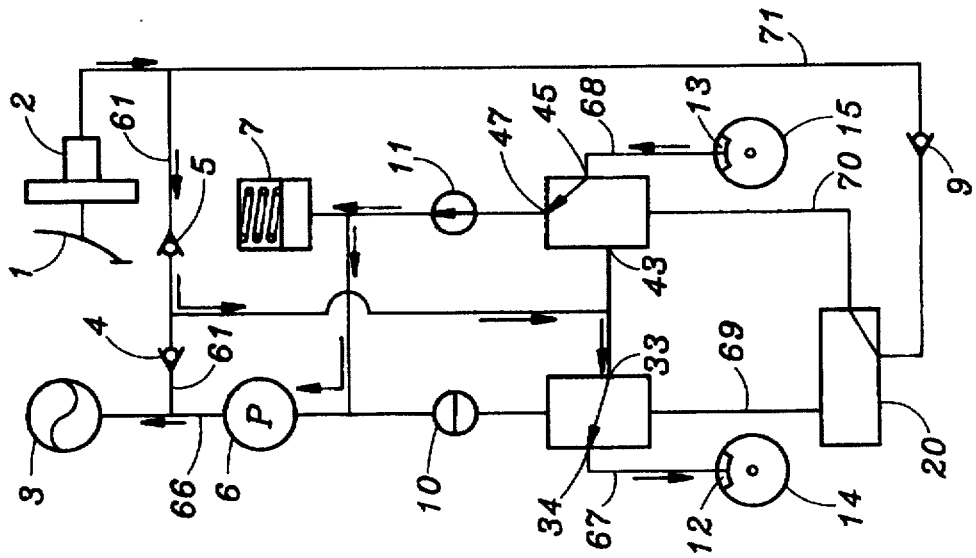
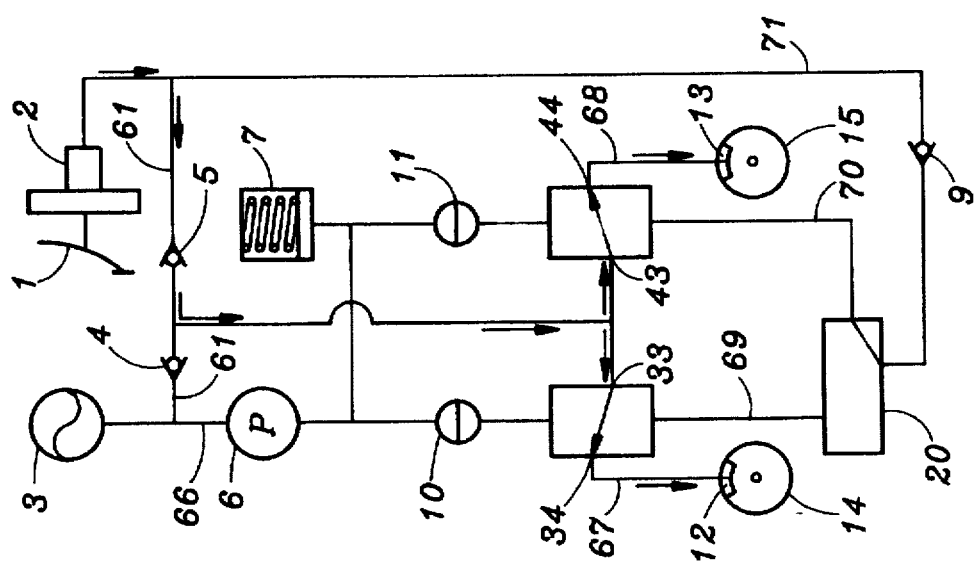

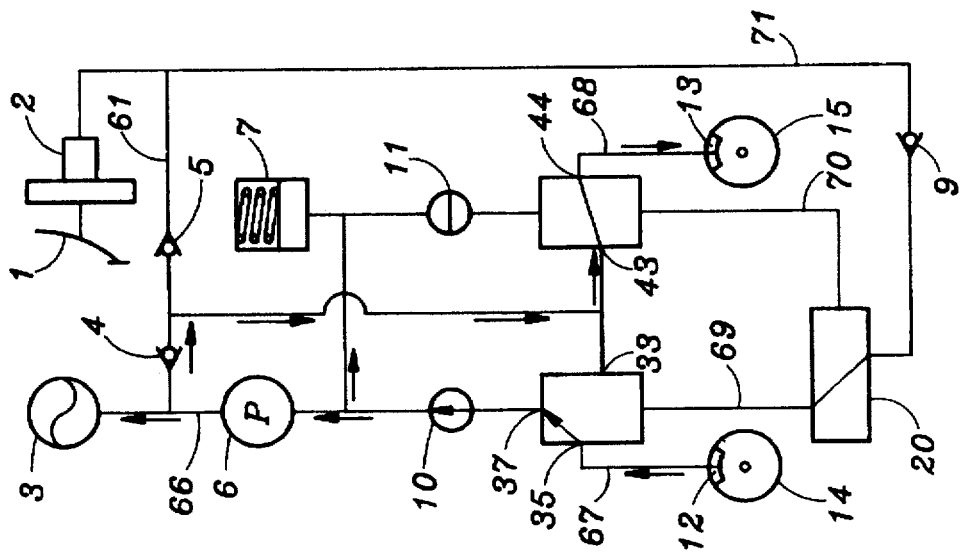
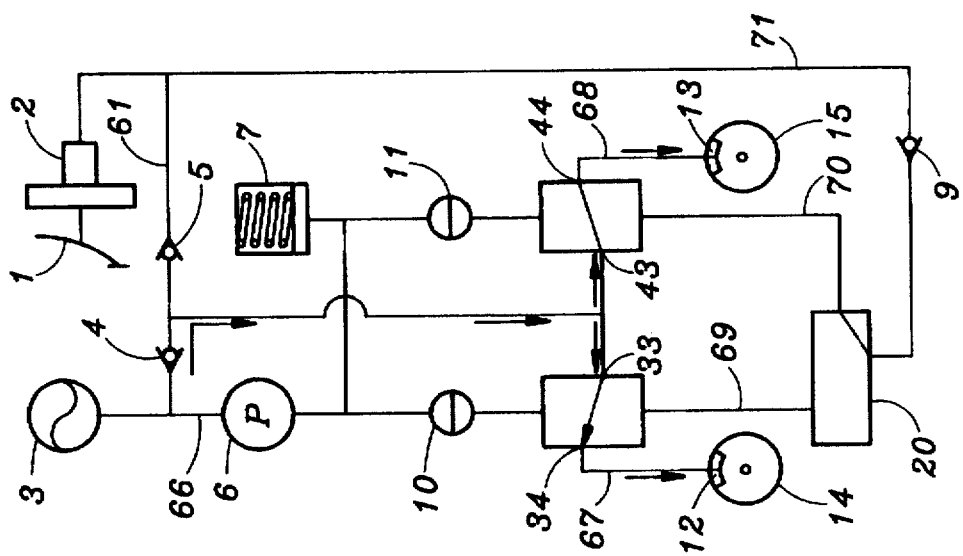

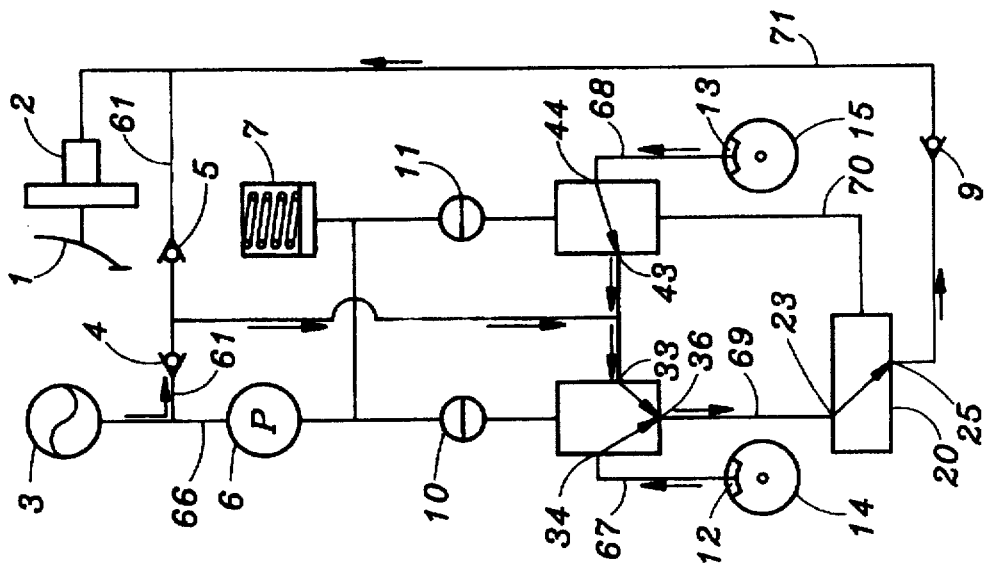
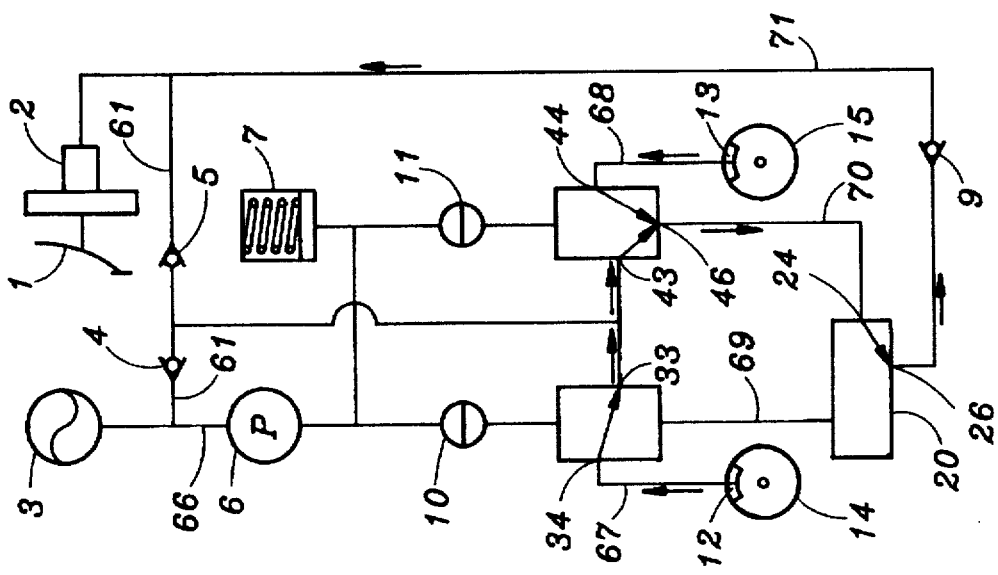

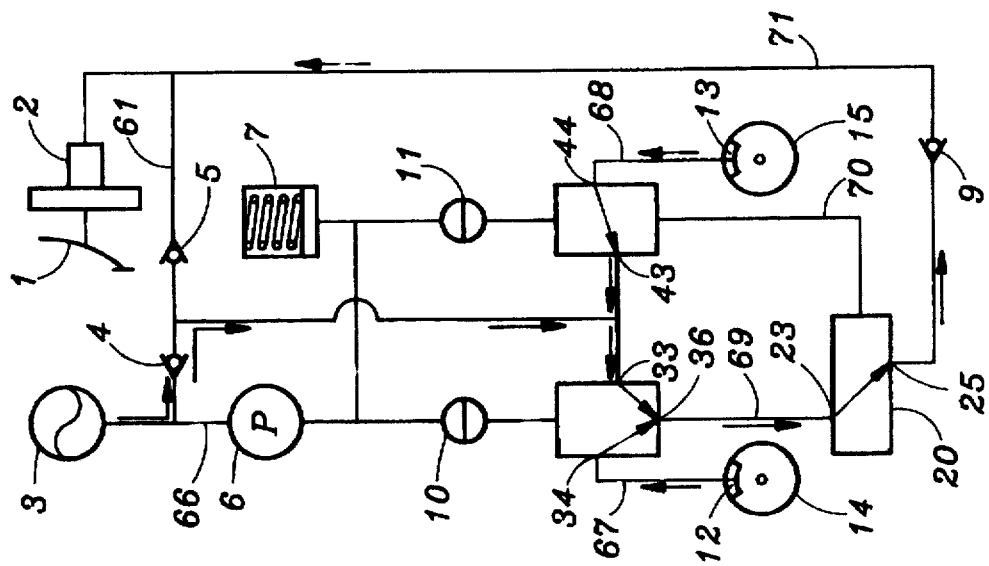
F I G. 2j
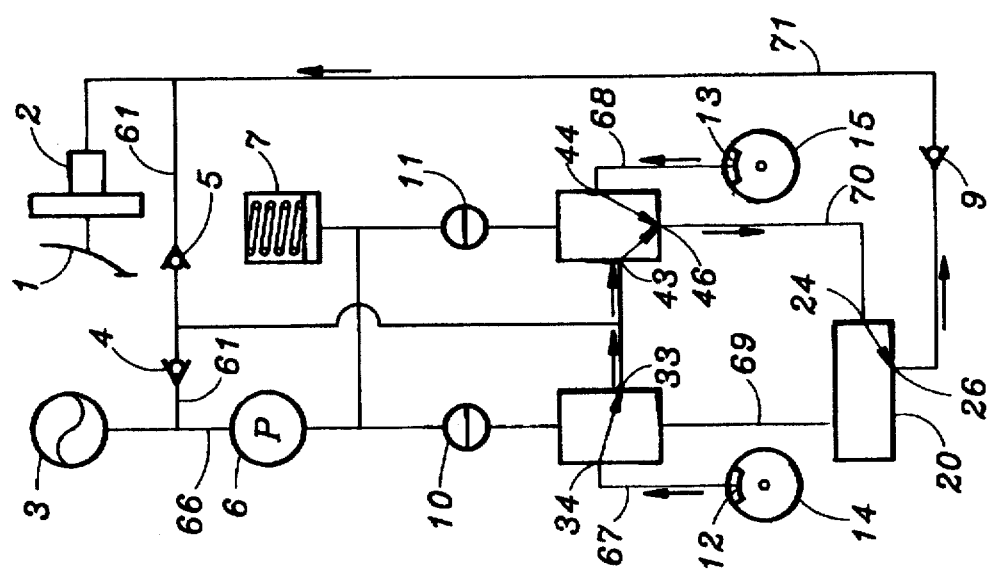
F I G. 2i

ANTI-SKID BRAKE CONTROL SYSTEM HAVING SPOOL VALVES

FIELD OF THE INVENTION

The present invention relates to an anti-skid brake control system for preventing the wheels of a motor vehicle from skidding during the braking of the vehicle, and more particularly, to an anti-skid brake control system for an automobile which is adapted to prevent the transmission of pressure pulsations from a pump towards the brake pedal.

BACKGROUND OF THE INVENTION

As is well known, hydraulic brake systems have been adopted in the automobile, and essentially, the braking of the vehicle is performed by wheel brakes by which the dynamic energy of the moving wheel is converted to heat energy by means of forces of friction.

Nowadays, the use of an anti-skid brake control system has been incorporated into numerous types of vehicle in order to prevent tire-road slip caused by overbraking relative to a road surface condition or a sudden stop during the braking of the vehicle, thereby enhancing the controllability and stability of the vehicle.

A conventional anti-skid brake control system is exemplified by U.S. Pat. Nos. 4,915,459 and 5,094,512. There, the anti-skid brake control system is designed and constructed to automatically reduce the braking pressure when the slip rate of the wheels exceeds a predetermined level. When the brake pressure is reduced in the anti-skid operation, the working fluid medium discharged out of each wheel brake is recirculated between a master cylinder and a pressure adjusting means by a pump. Because of this, several problems arise, for example, brake pedal vibrations resulting from pulsations of delivery pressure from the pump, noises caused by vibrations in the fluid piping, or the like.

In order to solve the above described problems, U.S. Pat. No. 5,004,302 of Yamata et al. discloses a fluid passage area switching means for switching the flow of the main fluid passage between a master cylinder and the brake cylinder at a recirculation point so that the flow to the brake cylinder is increased when the pump is out of operation, and the flow to the brake cylinder is reduced when the pump is in operation.

As shown in attached drawing FIG. 3, the passage area switching means 170 incorporates a master cylinder 120, a flow control valve 130, a wheel brake 140, a solenoid valve 150, a pump 160, and a reservoir 180. The passage area switching means 170 includes a fluid chamber 171 within which a movable element 172 is accommodated. The movable element 172 is capable of moving in the vertical direction during the anti-lock operation mode, although it is generally located by gravity in the lower part of the chamber in a normal braking operation.

The outer peripheral surface of the movable element 172 is spaced from the inner surface of the fluid chamber 171 by a gap 171f, and the upper surface of the movable element 172 is formed into a conical surface 172a. Accordingly, the working fluid discharged from the pump 160 flows into the fluid chamber 171 through fluid passages 171a, 171d, 171e, 171c in the normal braking operation mode. When the movable element 172 is raised by the working fluid discharged from the pump 160 during the anti-lock operation mode, the fluid passage 171d, having relatively large diameter, is closed by the upper protruding portion of the surface 172a although the small diameter fluid passage 171e is kept open.

Therefore, the working fluid discharged from the pump 160 is introduced into the fluid passage 171c through the passage 172d and the gap 171f of the movable element 172, and is directed to an inlet 131b of the flow control valve 130.

However, the above described conventional method for preventing the transmission of the pressure pulsations of the pump have encountered various problems.

More specifically, since the small diameter fluid passage 171e of the small diameter is always kept open, the pulsations of delivery pressure from the pump 160 are transmitted to the master cylinder 120 through the fluid passage 171e, when the anti-lock operation mode is carried out to have the pump operated at a higher pressure than in the normal braking operation mode.

Further, the components of the passage area switching means 170 must be precisely processed in order to obtain the desired gap 171f between the outer peripheral surface of the movable element 172 and the inner surface of the fluid chamber 171. If the gap 171f becomes larger, the working fluid discharged from the pump 160 cannot move the movable element 172 completely upward, thereby preventing the closing operation of the large diameter fluid passage 171d by the conical surface 172a thereof during the anti-lock operation mode.

In addition, narrowing the gap 171f is apt to deteriorate the reliability of the system when possible contaminants invade thereto to make the movable element 172 stick.

Furthermore, when the anti-lock operation mode is carried out, the working fluid discharged from the pump 160 is passed through the narrow gap 171f, thereby preventing the provision of sufficient fluid passage, and delaying the propagation time of fluid pressure, resulting disadvantageously in a delay of recovery of the braking pressure as well as an excessively high pressure at the outlet of the pump.

The present invention is intended to overcome the above described disadvantages of the conventional techniques.

Therefore, it is an object of the present invention to provide an anti-skid brake control system for an automobile which is capable of effectively preventing the transmission of pressure pulsations of the working fluid from a pump towards the brake pedal.

Another object of the present invention is to provide an anti-skid brake control system for an automobile which is capable of promptly responding to the slip rate of any wheels.

SUMMARY OF THE INVENTION

The anti-skid brake system of the present invention is arranged to supply brake fluid to first and second wheel brakes for first and second wheels, respectively, of an automobile.

The system of the present invention comprises a master cylinder arranged to supply brake fluid through a master cylinder supply line. There are first and second control valves which receive brake fluid from the master cylinder. Each control valve has a first position to direct brake fluid to their respective brakes in a normal mode of operation. Each control valve has a second position for the anti-lock mode of operation to isolate its related wheel brake from the master cylinder supply line and direct brake fluid along a related by-pass flow path and thus reduce braking pressure to the related wheel brake.

There are first and second by-pass valves arranged to receive by-pass flow of brake fluid from the respective control valve. Each by-pass valve has a first position to block by-pass flow for normal mode of operation and a second position to permit by-pass flow in the anti-lock mode.

A pump is provided to receive by-pass flow from the first and second by-pass valves in the anti-lock mode and recirculate the by-pass brake fluid in the system.

There is further a release valve operably connected to the first and second control valves to direct brake fluid from the first and second control valves to the master cylinder. The release valve is responsive to fluid pressure levels in the control valves, so as to be movable between first and second positions. This is accomplished in a manner that with the first control valve in its anti-lock mode and being at a lower pressure relative to the second control valve, the release valve is in the first position to be able to connect the first control valve to the master cylinder. With the second control valve in its anti-lock mode and being at a lower pressure relative to the first control valve, the release valve is in the second position to be able to connect the second control valve to the master cylinder.

Thus, with one of the control valves in its anti-lock mode and the other control valve in its normal operating mode, the pump delivers brake fluid for the other control valve which is isolated by the release valve from transmitting pump pressure pulses back to the master cylinder.

Another feature of the present invention is that the release valve is arranged so that with both control valves in the normal operating mode and valve pressure of the first and second control valves being at least approximately equal, the release valve remains in the second position. Thus, a pressure release route during release of braking pressure is from the first wheel brake through the first control valve to the second control valve and to the release valve. The flow path from the second wheel brake is through the second control valve to the release valve.

In the preferred configuration, the release valve comprises a valve housing and a valve element movable between the first and second positions. The valve element is responsive to pressure from the first and second control valves being applied oppositely thereto. The valve element is urged by biasing means toward the second position, whereby with a higher pressure in the second control valve operating in a normal mode, and a lower pressure in the first control valve operating in an anti-lock mode, the valve element is urged toward the first position to thus isolate the second control valve from the master cylinder. With valve pressure in the second control valve being lower than valve pressure in the first control valve, or with valve pressures in the first and second control valves being approximately equal, the valve element remains in the second position to isolate the first control valve from the master cylinder.

The valve element of the release valve comprises a valve spool, mounting for linear motion in the valve housing. The pressure from the first and second control valve is directed at opposite ends of the spool, and there is a biasing means, comprising spring means, urging the spool toward a second position.

Each of the control valves comprises a housing and a control valve element movable in the housing between a first position and a second position. Each control valve element defines with the control valve housing a brake pressure chamber and a decompression chamber arranged so that higher pressure in the pressure chamber urges the control valve element toward a second position. This is accomplished in a manner that when its related by-pass valve is opened so as to reduce pressure in the decompression chamber, the control valve element moves from the first position toward the second position, thus shutting off brake fluid pressure from the master cylinder supply line.

Additionally, in the preferred embodiment, there is pressure equalizing orifice means interconnecting the brake pressure chamber and decompression chamber each of the control valves. This is done in a manner that if there is a pressure differential between the pressure and decompression chambers of one of the control valves, there will be flow through the related orifice to tend to equalize the pressure in the pressure and decompression chambers. Each of the control valves also has biasing means to urged the valve element toward its first position. Thus, when there is substantially equal pressure between the pressure and decompression chambers of one of the control valves, it's related valve element is urged toward the first position of the control valve.

Also, in the preferred form of the invention, there is a low pressure accumulator to receive flow from the first and second by-pass valves. Also, there is a high pressure accumulator to receive flow from the pump and discharge the flow toward the control valves.

In the method of the present invention the components of the anti-skid brake system are provided as described above. These are operated as follows.

The master cylinder is operated to supply brake fluid through a master cylinder supply line, with this brake fluid being directed to first and second control valves. In the normal braking mode, each of these control valves is in the first position so as to direct the brake fluid to the first and second brakes respectively.

In response to a skid condition of either or both of the wheels, the control valve of the wheel in the skid condition is moved to the second position to cause flow from the related wheel brake to be directed to a related one of the first and second bypass valves. The bypass valves in turn direct the bypass flow to the pump.

The pump is operated so as to receive the bypass flow and recirculate the bypass flow in the system.

When the first control valve is in its anti-lock mode and is at a lower pressure relative to the second control valve, the release valve is in the first position not to connect the second control valve which is at a higher pressure relative to the first control valve, to the master cylinder. With the second control valve at its anti-lock mode position so as to have a lower pressure relative to the first control valve, the release valve is moved to the second position not to connect the first control valve which is at a higher pressure relative to the second control valve, to the master cylinder.

Other features of the present invention will become apparent from the following detailed description.

BRIEF DESCRIPTION OF THE DRAWINGS

The above object and other advantages of the present invention will become more apparent by describing in detail the preferred embodiment of the present invention with reference to the attached drawings in which:

FIG. 2a, 2b, 2c, 2d, 2e, 2f, 2g, 2h, 2i/2j somewhat schematic drawings, showing the system of FIG. 1, in various modes of operation.

DESCRIPTION OF THE PREFERRED EMBODIMENT

Figure 1:
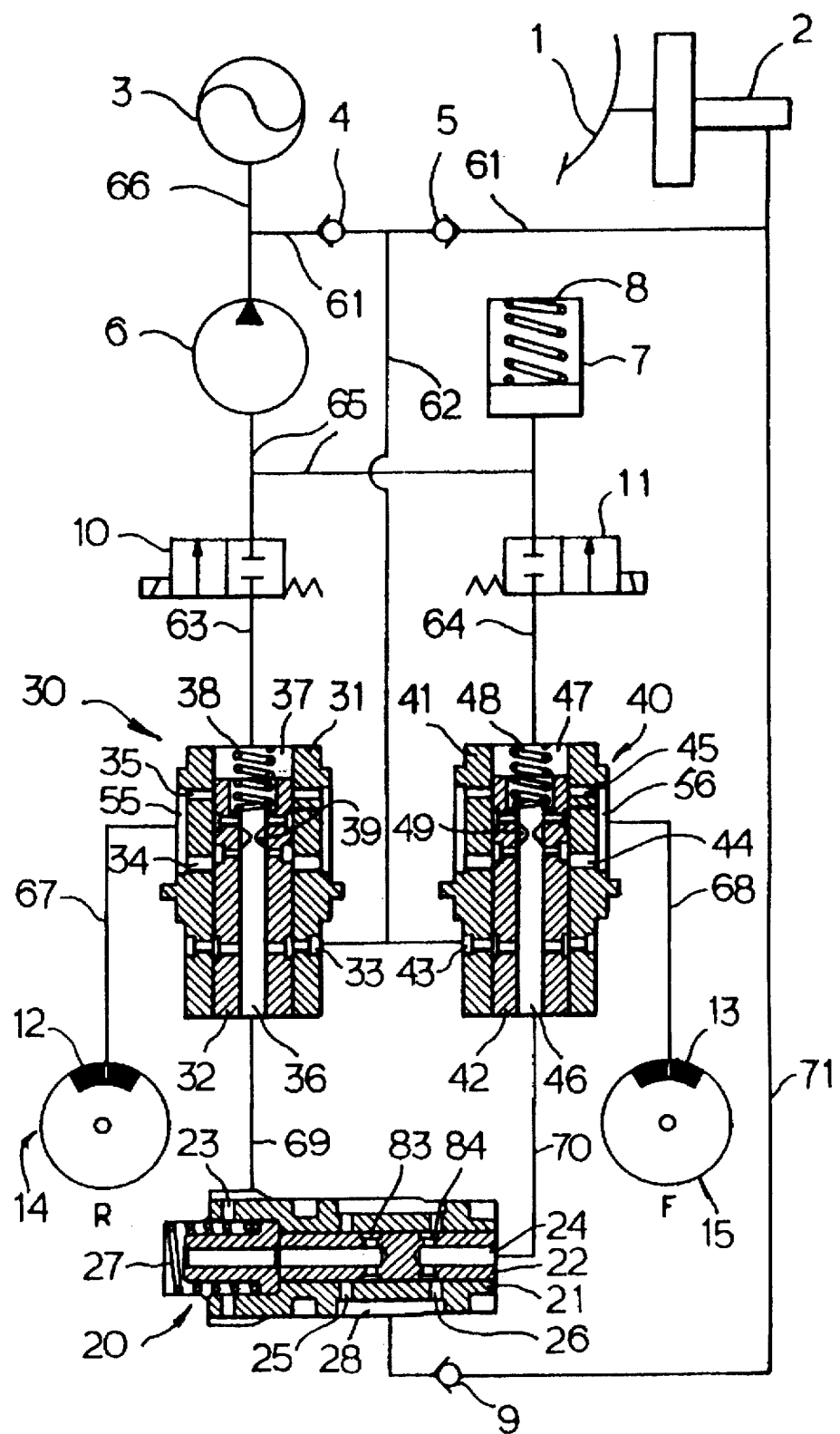
FIG. 1 is a schematic diagram showing the anti-skid brake control system configured in accordance with the present invention.

Referring to FIG. 1, a preferred embodiment of the anti-skid brake control system according to this invention comprises a brake pedal 1, a master cylinder 2, first and second flow control valves 30 and 40, a pump 6, first and second solenoid valve 10 and 11 (also called "bypass valves"), a low pressure accumulator 7, a pair of check valves 4 and 5, a high pressure accumulator 3, a release valve 20, a check valve 9, and a first and a second wheel brake 12 and 13. The check valves 4 and 5 are provided for preventing communication of the working fluid between the master cylinder 2 and the pump 6. Also, the check valve 9 and the release valve 20 are provided for releasing the braking pressure.

The master cylinder 2 communicates with a first port 33 of the first flow control valve 30 and with a first port 43 of the second flow control valve 40 through fluid passages 61 and 62. In response to actuation of the brake pedal 1, the fluid pressure from the master cylinder 2 is directed towards the first and second flow control valves 30 and 40.

Also, the outlet of the pump 6 communicates with the fluid passage 61 through a fluid passage 66. The check valves 4 and 5 are disposed in the fluid passage 61 such that the valve 4 placed near the pump 6 permits flow from the outlet of the pump 6 through the valve 4. The valve 5 near the master cylinder 2 permits flow in a direction opposite to that permitted by the valve 4, and it is disposed to open along the flow direction of the working fluid discharged from the master cylinder 2 toward the fluid passage 62. The fluid passage 62 is branched off at a location between the valves 4 and 5.

During the normal braking operation mode, the working fluid is supplied from the master cylinder 2 to the flow control valves 30 and 40 via the fluid passage 61, the check valve 5, and the fluid passage 62, and is prevented from being supplied to the pump 6 by the check valve 4. On the other hand, for the anti-lock operation, since the outlet pressure from the pump 6 may be higher than the pressure of the master cylinder 2, the working fluid discharged from the pump 6 is supplied to the flow control valves 30 and 40 via the fluid passages 66 and 61, the check valve 4, and the fluid passage 62, and is prevented from being supplied to the master cylinder 2 by the check valve 5.

The flow control valve 30 includes a housing 31 having a plurality of ports and a spool 32 disposed in the inner surface of the housing 31. At the periphery of the housing 31 there is a first port 33, a second port 34, and a third port 35.

The housing 31 and the spool 32 are of a hollow cylinder form. An orifice 39 is formed inside the spool 32. At the periphery of the spool 32, a plurality of through holes are arranged to communicate with the ports 33 and 34, and 35 of the housing 31, and with the interior of the spool 32. Thus, when the spool 32 moves upwards or downwards, the holes cause the ports 33 and 34, and 35 to be either opened or closed, thereby changing the fluid direction and the flow amount.

The area below the orifice 39 formed at the interior surface of the spool 32 constitutes a pressure chamber 36, where high pressure is maintained by the working fluid supplied from the master cylinder 2 or the pump 6. The area above the orifice 39 constitutes a decompression chamber 37, where a relatively low pressure is maintained by the operation of the orifice 39. The decompression chamber 37 is provided with a spring 38, which urges the spool 32 downwardly.

The second port 34 and the third port 35 are joined by a groove 55 formed at the peripheral side of the housing 31, and this groove 55 communicates through the fluid passage 67 with the first wheel brake 12. The pressure chamber 36 located below the orifice 39 communicates with a first port 23 placed at one end of the release valve 20 through the fluid passage 69. Also, the decompression chamber 37 formed above the orifice 39 communicates with the first solenoid valve 10 via the fluid passage 63.

The second flow control valve 40 has the same configuration as that of the above described first flow control valve 30. Thus, only the essential features of the valve 40 will be described hereinafter.

Referring to the drawing, a second port 44 and a third port 45 are joined by a groove 56 formed at the peripheral side of the housing 41, which communicates with the second wheel brake 13 via the fluid passage 68. The pressure chamber 46 formed below the orifice 49 communicates with a second port 24 placed at the other end of the release valve 20 by the fluid passage 70. Also, the decompression chamber 47 located above the orifice 49 communicates with the second solenoid valve 11 via the fluid passage 64.

The aforementioned flow control valves 30 and 40 are disposed in parallel with each other. The first and second solenoid valves 10 and 11 are normally closed and disposed in parallel with each other, communicating with the inlet of the pump 6 via the fluid passage 65. The fluid passage 65 is provided with the low pressure accumulator 7. Also, the fluid passage 66 leading from the outlet of the pump 6 communicates with the fluid passage 61, and an extension of the fluid passage 66 is provided to communicate with the high pressure accumulator 3.

The release valve 20 is comprised of a housing 21 having four ports 23, 24, 25 and 26, and a spool 22 placed inside the housing 21.

As mentioned above, the first port 23 located at one end of the housing 21 communicates with the pressure chamber 36 in the first flow control valve 30 via the fluid passage 69, and the second port 24 located at the other end of the housing 21 communicates with the pressure cheer 46 in the second flow control valve 40 via the fluid passage 70.

Further, formed at the periphery of the housing 21, the third port 25 and the fourth port 26 are joined via a groove 28 and communicate with the master cylinder 2 via the fluid passage 71.

Also, at the peripheral side of the spool 22, holes 83 and 84 are formed, which come into communication with the third and fourth ports 25 and 26, respectively. These are arranged so that when the spool 22 is moved right and left by the pressure differential of the fluid introduced between the first port 23 (which communicates with the pressure chamber 36 of the first flow control valve 30) and the second port 24 (communicating with the pressure chamber 46 of the second flow control valve 40), the third or fourth port 25, 26 selectively communicate with the fluid passage 71.

During the normal braking operation, the first flow control valve 30 communicates with the first port 33 and the second port 34 via the fluid passage 67, and the third port 35 is prevented from communicating with the fluid passages by the wall of the spool 32. The above description is similarly applicable to the second flow control valve 40.

Again, during a normal braking operation, the second port 24 of the release valve 20 communicates with the fourth port 26, and the first port 23 thereof is prevented from communicating with the third port 25 by the wall of the spool 22.

The operation of the present invention will now be described with reference to FIGS. 2a through 2j. These FIGS. 2a through 2j are somewhat schematic drawings of the anti-skid braking system shown in FIG. 1. The positions of the control valves 30 and 40, the release valve 20, and the by-pass valves 10 and 11 are indicated schematically, and the flow paths through these valves are simply illustrated by connecting lines. In this description, the various modes of operation being described will be placed under appropriate headings.

(a) Normal braking operation (without either wheel skidding)

In the normal operating mode (shown in FIG. 2a), the components of the system are positioned as shown in FIG. 1. More specifically, the bypass valves 10 and 11 (also called solenoid valves) are closed, thus isolating the two control valves 30 and 40 from the low pressure accumulator 7, the pump 6 and the high pressure accumulator 3. With the bypass valves 10 and 11 closed, the upper decompression chambers 37 and 47 of the control valves 30 and 40 are open only to the orifices 39 and 49, respectively, so that the pressure between the lower chamber 36 and the upper decompression chamber 37 of the valve 30 is equalized, and also the pressure between the lower pressure chamber 46 and upper decompression chamber 47 of the control valve 40 is equalized. Thus, the spring 38 presses its related spool 32 downwardly, and the spring 48 of the control valve 40 presses its related spool 42 downwardly. The spool 22 of the release valve 20 is urged by the spring 27 to its right hand position.

During normal braking operation, when the brake pedal 1 is depressed, high pressure fluid flows from the master cylinder 2 through the fluid passage 61 and check valve 5 to the fluid passage 62 and to the inlet ports 33 and 43 of the first and second flow control valves 30 and 40, respectively. The fluid entering the port 33 flows through the valve 30 into the passage 67 to actuate the wheel brake 12. In like manner, the fluid passing into the port 43 of the control valve 40 flows into the passage 68 to actuate the brake 13.

With the brake pedal 1 depressed, the return passage 71 is at the higher braking pressure and maintains the check valve 9 in its closed position. Thus, during the normal braking mode there is no return flow through the release valve 20.

When the brake pedal 1 is released, so as to drop the pressure in the master cylinder 2, the pressure applied to the wheel brakes 12 and 13 is released (with the check valve 5 preventing any reverse flow back to the master cylinder 2), the release of pressure from the brake 12 passes back through the control valve 30, from the port 33 over to the port 43 and into the chamber 46 of the control valve 40. Also the flow from the brake 13 is into the chamber 46 of the valve 40. Then the pressure release route for both brakes 12 and 13 is from the cheer 46 through the passage 70 into the release valve 20, thence through the check valve 9, back up the fluid passage 71 and to the master cylinder 2. This operation of the brake system in the release mode will be described in more detail later herein.

At this point, it may be of help to give at least a brief explanation concerning the release valve 20. The normal operating mode of the release valve 20 is with the spool 22 in the right hand position, as shown in FIG. 1, and the release path from both brakes 12 and 13 is through the control valve 40 and downwardly to the port 24 and out the port 26 (see FIG. 1) to flow back to the master cylinder 2. Under some circumstances, when there is an imbalance in the pressure chambers 36 and 46 of the control valves 30 and 40, so that the pressure in the chamber 36 is relatively low, then the release valve 20 will shift from the position shown in FIG. 1 to permit the flow from the chamber 36 directly through the release valve 20. This will be described in more detail later herein in section (h) with reference to FIG. 2h.

(b) Anti-lock mode of operation when one wheel 14 or 15 begins skidding

This will be explained with reference to FIG. 2b. When the brake pedal 1 is depressed and one of the two vehicle wheels skids due to a low frictional force between the wheel and the surface of the road, the braking pressure applied to that wheel must be reduced. Let us first assume that it is the wheel 15 that skids. When the rotation of the wheel 15 drops below a certain level, a sensor (detecting this) starts the pump 6 operating (driven by an electric motor), and the second solenoid valve 11 is actuated to move it to its open position. Thus, the working fluid in the decompression chamber 47 (see FIG. 1 and FIG. 2b) is able to pass through the solenoid valve 11 to the low pressure accumulator 7. This decreases the pressure in the decompression chamber 47 to the extent that the higher pressure in the chamber 46 pushes the spool 42 in the control valve 40 upwardly against the force of the spring 48. This closes the inlet port 43 (thus shutting off flow to the brake 13) and opens the outlet port 45 to the decompression chamber 47.

The result is, as shown in FIG. 2b, that the fluid pressure in the wheel brake 13 is released upwardly through the passage 68, through the control valve 40 and upwardly through the valve 11 to the low pressure accumulator 7.

At the same time, the pump 6 starts operating to draw the fluid flowing through the solenoid valve 11 and pumps this fluid upwardly to the high pressure accumulator 3 where this fluid begins to accumulate. At this time, with the person applying force to the brake pedal, the fluid pressure from the master cylinder 2 would normally be sufficiently high so that the check valve 4 will remain closed so that there is no flow from the pump 6 through the passage 61 and into the passage 62.

Also, with the person applying force to the brake pedal 1, fluid pressure from the master cylinder 2 is applied through the passages 61 and 62 and through the control valve 30 to maintain the braking pressure at the wheel brake 12.

If the wheel 14 begins to skid, but the wheel 15 is in the normal mode of operation, then the first solenoid valve 10 opens. Then there is substantially the same mode of operation as described immediately above, except that the first control valve 30 and its wheel brake 12 go into the anti-lock mode, while the other control valve 40 and its wheel brake 13 continue in the normal operating mode. Therefore, this reverse situation will not be described in detail herein.

Figure 2C:
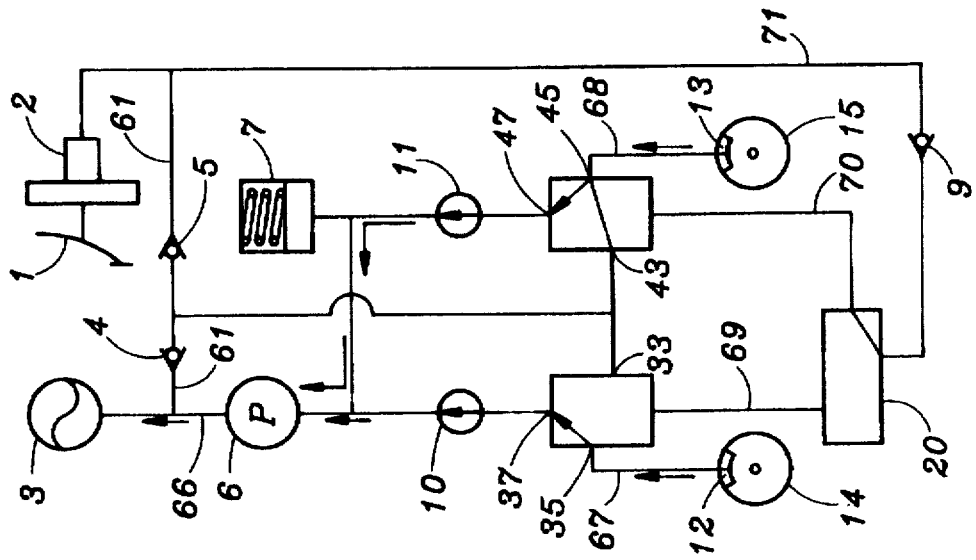

(c) Increasing the brake fluid pressure to one wheel brake when the other wheel brake is in the anti-lock operating mode This is explained with reference to FIG. 2c. We will assume first that the wheel 15 is encountering a low friction surface so as to be skidding. In this situation, the present invention enables the higher braking pressure to be supplied to the other wheel brake 12. This occurs as follows.

As the discharge pressure of the pump 6 continuously increases as it pumps more fluid into the high pressure accumulator 3, the pressure generated by the pump 6 reaches a level where it is higher than the pressure supplied from the master cylinder 2. This causes the check valve 4 to open so that pressurized fluid discharged from the pump 6 closes the check valve 5 to isolate the master cylinder 2 from the passage 62.

Further, the brake fluid discharged from the pump 6 flows downwardly through the passage 62, through the control valve 30 and to the wheel brake 12. This can generate a braking pressure considerably higher than the braking pressure created by actuating the brake pedal 1.

Also, the spool 22 of the release valve 20 is in the right hand position as shown in FIG. 1, but the control valve 40 is out of communication with the line 62. Hence, the pump 6 is isolated from the master cylinder 2.

On the other hand, if it is only the left wheel 14 that is skidding, and the wheel 15 is operating normally, then the pump 6 will be supplying high pressure fluid to the brake 13 through the valve 40. At this time the imbalance of pressure in the two pressure chambers 36 and 46 causes the spool 22 of the valve 20 to move to the left to isolate the chamber 46 from the check valve 9 and the line 71, so that pulsations from the pump 6 do not reach the master cylinder 2. This movement of the spool 22 of the release valve 20 will be described more fully later herein with reference to Section (f) herein.

(d) With one wheel 15 already slipping and its wheel brake 13 in the anti-lock mode, the other wheel 14 also begins to slip.

To describe this operation, reference will be made to FIG. 2d.

To continue with the analysis conducted in the section immediately above, let us now assume that the brake 113 is in the anti-lock mode and the brake pressure that is applied to the wheel brake 12 becomes sufficiently high so that the wheel 14 also begins to slip. When this happens, the following occurs.

Figure 2D:
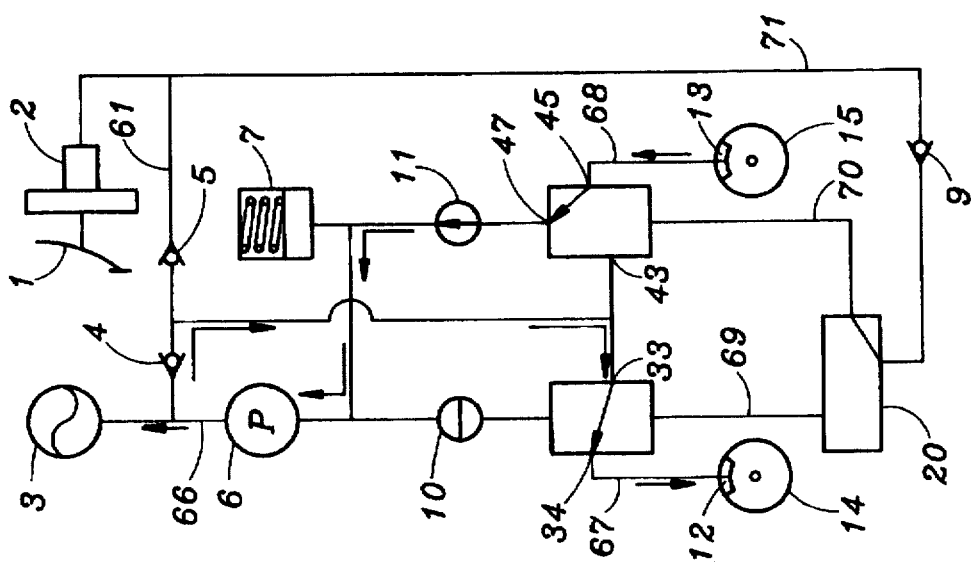

The first solenoid valve 10, which responds to the condition of the wheel 14 becoming locked, is actuated so that it moves to open position, as shown in FIG. 2d. This reduces the pressure in the upper decompression chamber 37 of the control valve 30, and the higher pressure in the lower pressure chamber 36 is sufficient to move the spool 32 upwardly to close the port 33 and open the wheel brake line 67 to the solenoid valve 10. When this happens, the working fluid from the first wheel brake 12 passes through the third port 35 and through the decompression cheer 37 upwardly through the solenoid valve 10, reducing the braking pressure applied to the first wheel 14. At this time, both wheel brakes 12 and 13 are operating in the anti-lock mode of operation. This situation is shown in FIG. 2d.

Of course, if the braking pressure applied to the first wheel 14 never did reach a level high enough (relative to the condition of the road surface so that the wheel would start to skid) there is a continuous increase in the braking pressure from the pump 6, thereby further enhancing the braking of the vehicle, and this was described in previous section (c).

Figure 3:
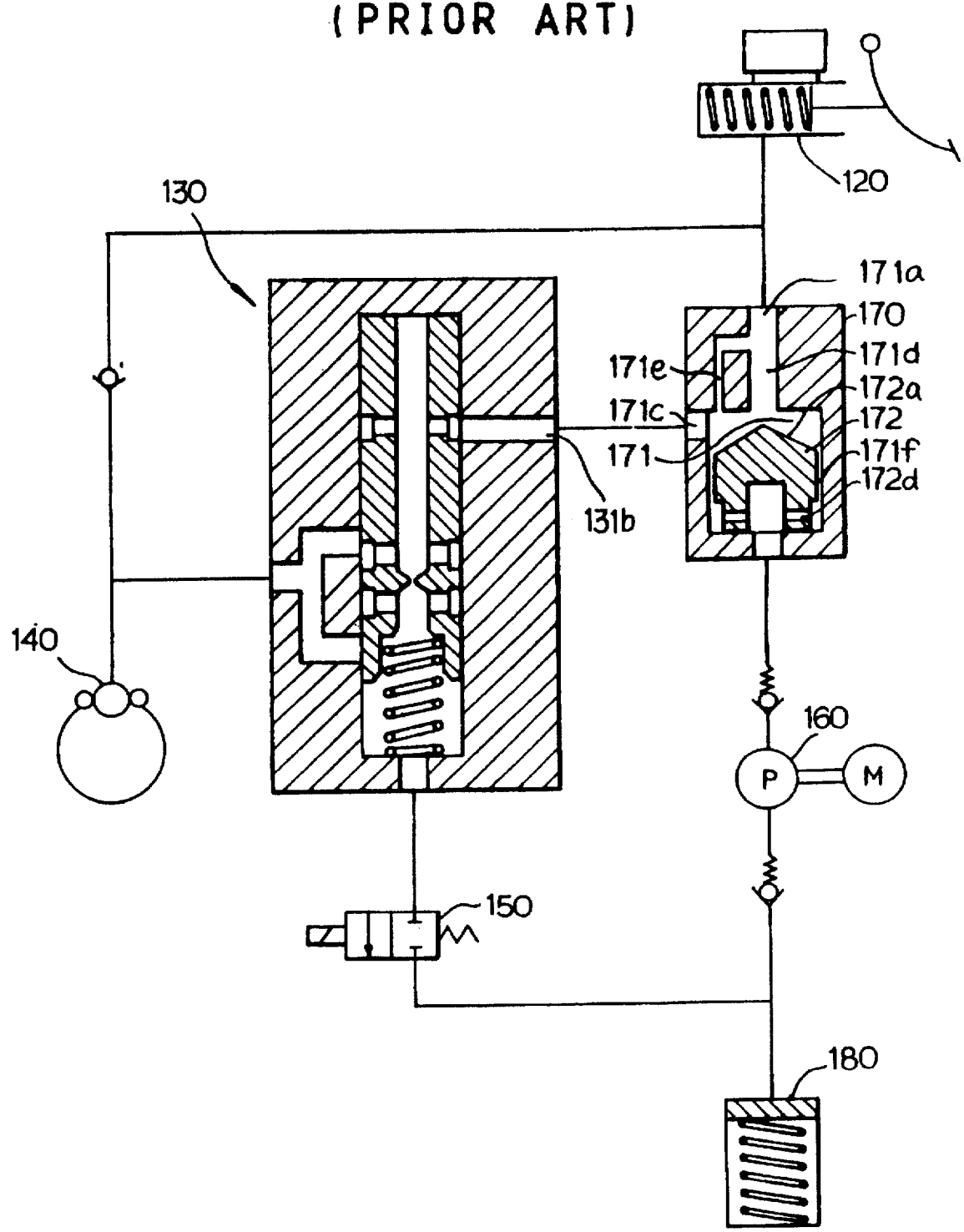
FIG. 3 is a schematic diagram showing the conventional anti-skid brake control system.

(e) One wheel brake continues operating in the normal braking mode, and the other wheel is transitioning from the anti-lock mode back to the normal braking mode This will be described with reference to FIG. 3e. Let us assume that the first wheel 14 has not gone into a skid condition, and that the pressure in the second wheel brake 13 has decreased sufficiently (and/or the friction between the wheel 15 and the surface has increased sufficiently) so that the wheel brake 13 is going out of the anti-lock mode, and the wheel 15 is beginning to rotate so that the slipping rate drops below the predetermined level. This condition is sensed by the sensor operating the solenoid valve 11, and the solenoid valve 11 is moved to the closed position, this being shown in FIG. 2e. Thus, the discharge of working fluid from the decompression chamber 47 to the pump 6 is prevented and the pressure in the decompression chamber 47 begins to rise as fluid flows from the pressure cheer 46 upwardly through the orifice 49. This results in the spring 48 pushing the spool 42 downwardly. This downward movement of the spool 42 continues until the first port 43 is opened. Let us further assume that in this situation, the frictional engagement between the wheel 15 and the roadway is not high enough to totally prevent slipping, but is high enough to cause the wheel 15 to rotate to some extent. Here the spool 42 reaches the balance point between the pressure chamber 46 and the decompression chamber 47 against the spring 48.

In this condition, the braking fluid pressure is modulated either upwardly or downwardly to maintain the slipping rate below the predetermined value, with the solenoid valve opening and closing alternately. The pressure difference on opposite sides of the orifice 49 will be constantly controlled by the spring 48 and the pressure drop caused by the flow through orifice 49. On the assumption that there is flow supplied from the high pressure accumulator 3 to the second wheel brake 13, this also will influence the pressure drop across the orifice 49. When the slippage in the wheel 15 is reduced sufficiently, then the solenoid valve 11 closes for a sufficient length of time for the pressure between the decompression chamber 47 and the high pressure chamber 46 to equalize, and the spool 42 moves to its full downward position.

Further, when the fluid in the low pressure accumulator 7 is substantially discharged due to the continuous operation of the pump 6, and the pressure of the high pressure accumulator 3 is reduced below the pressure of the master cylinder 2, the check valve 5 is opened by the fluid pressure from the master cylinder 2, and the opposite check valve 4 is closed. At this time, the braking pressure is increased to the level of the pressure of the master cylinder 2. As indicated above, when the pressures of the pressure chamber 46 and the decompression chamber 47 are the same, the spool 42 is moved downwardly and the system returns to its normal braking operation.

Let us now examine the operation of the release valve 20 when this is occurring. To review the present situation, the first wheel brake 12 is operating normally (i.e. no slippage of the wheel 14) and the second wheel brake 13 is operating in the anti-lock mode. In this situation, there will be a higher pressure in the chamber 36 of the control valve 30, and this higher pressure is directed into the port 23 of the release valve 20 and in turn is directed at the left face of the spool 22 to urge the spool 22 (in addition to the urging of the spring 27) to the right as seen in FIG. 1.

In this position, the first through hole 83 of the spool 22 is closed and the spool 22 closes the third port 25. In this position of the valve 20, the fluid passage 69 which leads from the pressure chamber 36 of the first flow control valve 30 can not communicate through the release valve 20 with the fluid return passage 71 which communicates with the master cylinder 2.

(f) The second wheel brake 13 is transitioning from the anti-lock mode back to the normal braking operation, while the first wheel brake 12 is still in the anti-lock mode Let us now assume that both the first and second wheel brakes 12 and 13 have previously moved to the condition where both of the wheel brakes 12 and 13 are in an anti-lock mode of operation, as shown in FIG. 2d. Let us further assume that we now have the situation where the slippage of the second wheel 15 has decreased below the allowable limit, and the second wheel brake 13 is transitioning back to the normal mode of operation.

Reference is now made to FIG. 2f. It can be seen that with the first wheel brake 12 in the anti-lock operating mode, the fluid pressure path is from the wheel brake 12 through the control valve 30 through the solenoid valve 10 to the pump 6 thence through the check valve 4 and downwardly through the passage 62.

The second wheel brake 13 is returning to normal operation so that the slippage has gone below a minimum level, and the solenoid valve 11 has closed. Thus, pressure becomes equalized between the high pressure cheer 46 and the decompression chamber 47 of the control valve 40, causing the spool to move downwardly, and now fluid flow begins from the passage 62 toward the wheel brake 13.

However, with the wheel brake 12 in its anti-lock mode of operation, the pump 6 continues to pump fluid to the high pressure accumulator 3 and (if the fluid pressure of the pump 6 is higher than that exerted at the master cylinder 2) the pump 6 will pump fluid through the check valve 4 downwardly through the passage 62 and into the inlet port 43 of the control valve 40. Thus, this pumped fluid moves into the high pressure chamber 46 of the control valve 40 and thence through the passage 70 to the release valve 20. If the release valve 20 remains in its right hand position, then the pressure pulses from the pump would be transmitted through the valve 20 and the check valve 9 upwardly through the passage 71 to the master cylinder 2, and these pulsations would in turn be directed toward the brake pedal 1.

This condition is alleviated as follows. With the wheel brake 12 in the anti-lock mode, the spool 32 of the control valve 30 has moved upwardly so as to shut off flow through the port 33. The pressure in the chamber 36 drops, since the chamber 36 is connected through the orifice 39 with the decompression chamber 37 (which is now at a relatively low pressure). With the pressure in the chamber 46 of the control valve 40 being in a higher pressure, this pressure is exerted at the second port 24 on the right hand side of the release valve spool 22, and this overcomes the lower pressure at the first port 23 of the release valve spool 22 and also the force of the spring 27.

The result is that the release valve spool 22 moves to the left. This moves the second through hole 84 of the spool 22 out of communication with the fourth port 26 and causes the first through hole 83 to communicate with the third port 25. Thus, there is a flow passage open from the passage 69 through the port 23, outwardly through the through hole 83 and port 25, through the check valve 9 and the passage 71 back to the master cylinder 2. During this time, since the control valve 30 is out of communication with the passage 62, it does not feel the pulsations of the pump 6. These pulsations are isolated from being transmitted back to the master cylinder 2 and thence to the brake pedal 1.

It is apparent that the operation of the release valve 20 is such that the flow control valve 30 or 40 which has the lower pressure in the chamber 36 or 46, respectively, communicates with the master cylinder through the check valve 9. If the release valve 20 did not function as described above, when one of the wheels 14 or 15 is in the anti-lock mode and if the working fluid from the high pressure accumulator 3 has a higher pressure than that of the master cylinder 2, the pressure from the accumulator 3 and pump 6 could be transmitted back to the master cylinder through the release valve 20 and through the check valve 9. However, this is prevented by the arrangement of the release valve as described above.

(g) Releasing the braking pressure during the normal mode of operation.

This was described briefly previously herein with reference to Section (a) above, and will now be explained further with reference to FIG. 2g.

When the first and second wheels 14 and 15 are in the normal braking operation without any slipping, the system is as shown in FIG. 2a. Let it now be assumed that the brake pedal is released. When this occurs, working fluid is able to flow from the second wheel brake 13 through the fluid passage 68, the second port 44 of the second control valve 40, the pressure chamber 46, the fluid passage 70 and to the second port 24 of the release valve 20. The spool 22 of the release valve 20 is in the normal right hand position (as in FIG. 1), so the fluid flows through the ports 24 and 26 of the release valve 20 to open the check valve 9. Thus, the fluid returns to the master cylinder 2 by way of the fluid passage 71. As a result, the braking of the second wheel 15 is released.

The working fluid discharged from the first wheel brake 12 is introduced to the first port 43 of the second control valve 40 as follows. The flow from the brake 12 is through the fluid passage 67, the second port 34 of the first control valve 30, the pressure chamber 36, through the first port 33 and thence to the first port 43 to join the working fluid from the second wheel brake 13 in the pressure chamber 46 of the second control valve 40.

(h) Releasing the brake while the first wheel brake 12 is in the anti-lock mode of operation and the second wheel brake 13 is in the normal mode of operation.

This will be described with reference to FIG. 2h. It will be recalled from the description in Section (f) above and in reviewing the corresponding FIG. 2f, that with the wheel brake 12 in the anti-lock mode, the control valve spool 32 is in its upper position so as to block off flow at the port 33, and the decompression chamber 37 opens through the solenoid valve 10 to a low pressure area. Accordingly, the pressure in the pressure cheer 36 of the control valve 30 is relatively low. On the other hand, with the wheel brake 13 in its normal operating mode, and with the brake pedal 1 being depressed, there is a higher pressure exerted from the master cylinder 2 through the passage 62 and through the port 43, thus bringing the pressure in the chamber 46 of the control valve 40 to a higher pressure.

Accordingly, during this mode of operation, the spool 22 of the release valve 20 is moved to the left, since there is greater pressure at the second port 24 than there is at the first port 23. The effect of this is that the passage 69 from the pressure chamber 36 of the control valve 30 communicates directly with the check valve 9 and thence through the passage 71 to the master cylinder 2. This situation is shown in FIG. 2h.

When the brake pedal 1 is released, the pressure in the master cylinder 2 drops, and consequently the pressure in the chamber 36 of the control valve 30 also drops since it is discharged through the release valve 20 and through the check valve 9 back to the master cylinder 2. This causes the spool 32 in the control valve 30 to move downwardly because of the restoring force of the spring 38 so that the port 33 of the valve 30 comes into communication with the port 34 and in turn communicates with the wheel brake 12 through the passage 67. Thus, with the spool 42 of the control valve 40 already in its lower position, the two pressure chambers 36 and 46 of the control valves 30 and 40, respectively, communicate with each other through the passage 62 and equalize so as to be at the same pressure. At this time, the spool 22, due to the urging of the spring 27 returns to its original position (as in FIG. 1) for its normal braking mode. Thus, the fluid in the high pressure accumulator 3 and the fluid in the first and second wheel brakes 12 and 13 pass through the control valve 30, through the release valve 20 and the check valve 9, back to the brake cylinder 2.

(i) Releasing the brake while the wheel brake 13 is in the anti-lock mode of operation.

This will be described with reference to FIG. 2i. As was discussed in Section (b) above, with the wheel brake 13 in the anti-lock mode of operation, and with the wheel brake 12 in its normal braking mode, the pressure in the chamber 46 of the valve 40 is lower, relative to the braking pressure in the chamber 36 of the control valve 30. Thus, the spool 22 of the release valve 20 is in the right hand position, as shown in FIG. 1. Further, the spool 42 of the control valve 40 is positioned upwardly so as to close off the port 43 from the chamber 46 of the control valve 40. This condition is shown in FIG. 2b.

When the brake pedal 1 is released so as to reduce the pressure in the master cylinder 2, the working fluid in the chamber 46 is discharged through the release valve 20, thus causing the spool 42 to move downwardly so that the port 43 is open to the chamber 46, thus placing the chamber 36 of the valve 30 into communication with the chamber 46 of the valve 40. This provides a passage for the wheel brake 12 to release its fluid through the passage 67, through the valve 30, and to the chamber 46 of the valve 40. Also, the fluid from the wheel brake 13 passes into the chamber 46, so that the flow from both wheel brakes 12 and 13 is able to pass from the chamber 46 through the release valve 20 and back to the master cylinder 2. Also, the fluid in the high pressure accumulator 3 is discharged through the release valve 20. At this time, the first and second flow control valves 30 and 40 are in position for a subsequent normal braking operation.

(J) Releasing the brake pressure when both wheel brakes 12 and 13 are in the anti-lock mode of operation.

This will be described with reference to FIGS. 2j. As was described previously with reference to FIG. 3d, when both wheel brakes 12 and 13 are in the anti-lock mode of operation, the two control valves 30 and 40 close off their main inlet ports 33 and 43, respectively, and both wheel brakes 12 and 13 are opened to the solenoid valve 10 and 11, respectively. At the same time, the pump is drawing fluid from the wheel brakes 12 and 13, and the brake fluid is accumulating in the low pressure accumulator 7 and also is being moved by the pump 6 up to accumulate also in the high pressure accumulator 3.

With both wheel brakes 12 and 13 being in the anti-lock mode, the spool 22 of the release valve 20 will be either in the left or right position, depending upon the relative pressures in the chambers 36 and 46. If the pressure in the chamber 36 of the valve 30 is sufficiently lower than the pressure in the chamber 46 of the valve 40, then the spool 22 of the release valve 20 will be in the left hand position. On the other hand, if the pressures in the two chambers 36 and 46 are approximately equal or if the pressure in the chamber 36 is higher than that of the chamber 46, then the spool 22 of the release valve 20 will be in the right hand position (the normal position as shown in FIG. 1). When the brake pedal 1 is released so as to lower the pressure in the master cylinder 2, let us assume that the spool 22 is in the left hand position as shown in FIG. 2j. The spool 32 in the valve 30 will promptly move to the lower position, because of the abrupt release of pressure from the chamber 36 through the release valve 30 and to the master cylinder 2.

At approximately the same time, with the pressure in the master cylinder dropping, the fluid in the wheel brake 13 is discharging through the port 45 into the decompression cheer 47 and moving downwardly through the orifice 49 to equalize the pressure between the chambers 46 and 47 of the control valve 40. This causes the spool 42 of the valve 40 to move from the upper position to the lower position, where the inlet port 43 is in communication with the chamber 46, as shown in FIG. 2j. Thus, the chambers 36 and 46 come into communication with one another, so that the pressures in these chambers 36 and 46 are released through the passage 69, the release valve 20 and the passage 71, to the master cylinder 2. After that, the spool 22 of the release valve 20 moves to the right due to the urging of the spring 27. The system is now in position to operate normally during a subsequent braking operation.

It is obvious that various modifications could be made without departing from the basic teachings of the present invention.

What is claimed:

1. An anti-skid brake system arranged to supply brake fluid to first and second wheel brakes for first and second wheels, respectively, of an automobile, said system comprising:

a. a master cylinder arranged to supply brake fluid through a master cylinder supply line;

b. first and second control valves arranged, to receive brake fluid from said master cylinder supply line, each control valve having a first position where the first and second control valves direct the brake fluid to the first and second brakes, respectively, in a normal operating mode, and a second position for an anti-lock mode of operation to isolate its related wheel brake from the master cylinder supply line and direct brake fluid along a related by-pass flow path and thus reduce braking pressure of the related wheel brake;

c. first and second by-pass valves arranged to receive by-pass flow of brake fluid from said first and second control valves, respectively, each by-pass valve having a first position to block by-pass flow in a normal operating mode and a second position to permit by-pass flow in an anti-lock mode;

d. a pump arranged to receive by-pass flow from said first and second by-pass valves in an anti-lock mode and recirculate the by-pass brake fluid in said system;

e. a release valve operatively connected to said first and second control valves to direct brake fluid from said first and second control valves to said master cylinder, said release valve being responsive to fluid pressure levels of said first and second control valves, so as to be movable between first and second positions, in a manner that with said first control valve in its anti-lock mode and being at a lower pressure relative to said second control valve, said release valve is in the first position to be able to connect said first control valve to the master cylinder, and with said second control valve in its anti-lock mode and being at a lower pressure relative to said first control valve, said release valve is in the second position to be able to connect the second control valve to the master cylinder, whereby with one of said control valves in its anti-lock mode and the other of said control valves in its normal operating mode, said pump delivers brake fluid toward the other control valve which is isolated by said release valve from transmitting pump pressure pulses back to said master cylinder.

2. The system as recited in claim 1, wherein said release valve is arranged so that with both control valves in the normal operating mode and valve pressure of said first and second control valves being at least approximately equal, said release valve remains in the second position, whereby a pressure release route during release of braking pressure is from said first wheel brake through said first control valve to said second control valve and to said release valve, and a flow path from said second wheel brake is through said second control valve to said release valve.

3. The system as recited in claim 2, wherein said release valve comprises a valve housing and a valve element movable between said first and second positions, said valve element being responsive to pressure from said first and second control valves being applied oppositely thereto, said valve element being urged by biasing means toward the second position of the release valve, whereby with a higher pressure in the second control valve operating in a normal mode, and a lower pressure in the first control valve operating in an anti-lock mode, said valve element is urged toward the first position to thus isolate said second control valve from said master cylinder, and with valve pressure in said second control valve being lower than valve pressure in said first control valve or with valve pressures in said first and second control valves being approximately equal, said valve element remains in the second position to isolate said first control valve from said master cylinder.

4. The system as recited in claim 3, wherein said valve element of the release valve comprises a valve spool, mounted for linear motion in said valve housing, and the pressure from the first and second control valves is directed at opposite ends of said spool, said biasing means comprising spring means urging said spool toward the second position.

5. The system as recited in claim 1, wherein each of said control valves comprises a control valve housing and a control valve element movable in said housing between a first position and a second position, each control valve element defining with said control valve housing a brake pressure chamber and a decompression chamber arranged so that higher pressure in said pressure chamber urges the control valve element toward the second position, in a manner that when its related by-pass valve is opened so as to reduce pressure in said decompression chamber, said control valve element moves from the first position toward the second position, thus shutting off brake fluid pressure from the master cylinder supply line.

6. The system as recited in claim 5, wherein there is pressure equalizing orifice means interconnecting the brake pressure chamber and decompression chamber of each of said control valves, in a manner that if there is a pressure differential between the pressure and decompression chambers of one of said control valves, there will be flow through the related orifice to tend to equalize the pressures in the pressure and decompression chambers, each of said control valves further comprising biasing means urging said control valve element toward its first position, in a manner that when there is substantially equal pressure between said pressure and decompression chambers of one of the control valves, its related control valve element is urged toward the first position of the control valve.

7. The system as recited in claim 6, wherein each control valve element is arranged so that in its first position, the control valve connects through inlet port means the master cylinder supply line with the brake pressure chamber and the related wheel brake is in turn connected through outlet port means with the brake pressure cheer of that control valve, whereby there is fluid communication from said master cylinder supply line through the brake pressure cheer of the control valve to the wheel brake, and with said control valve element in the second position, the related wheel brake communicates through by-pass port means of that control valve with the decompression chamber of the control valve to permit fluid flow from the related wheel brake through the decompression chamber and through the related by-pass valve to the pump.

8. The system as recited in claim 7, wherein said control valve element comprises a spool valve having a hollow interior, with said orifice separating said hollow interior into said pressure and decompression chambers, and said control valve element has first and second openings, which comprise said inlet port and said outlet port, and said valve element has a third opening which comprises said by-pass port.

9. The system as recited in claim 1, wherein there is a low pressure accumulator arranged to receive flow from the first and second by-pass valves and direct flow to said pump.

10. The system according to claim 9, further comprising a high pressure accumulator placed at an outlet of the pump for accumulating high pressure fluid discharged from the pump.

11. The system according to claim 1, wherein an outlet of the master cylinder and the outlet of the pump communicate with each other at a juncture location to form said master cylinder supply line as a common fluid passage, a first check valve leading from said master cylinder to said juncture location but preventing reverse flow to said master cylinder, and a second check valve leading from said pump to said juncture location but preventing reverse flow back to said pump, so as to prevent the working fluid discharging from the master cylinder to the pump and to prevent working fluid discharging from the pump to the master cylinder.

12. The system according to claim 11, wherein said first and second check valves form a shuttle valve in a T-shape form.

13. The system according to claim 1, wherein the fluid passage between the release valve and the master cylinder is provided with a check valve so as to prevent the working fluid from the master cylinder from being supplied to the release valve.

14. A method of alleviating wheel skid in a brake system arranged to supply brake fluid to first and second wheel brakes for first and second wheels, respectively, of an automobile, said method comprising:

a. operating a master cylinder to supply brake fluid through a master cylinder supply line;

b. directing said brake fluid from said master cylinder supply line to first and second control valves, each control valve having a first position where the first and second control valves direct the brake fluid to the first and second brakes, respectively, in a normal operating mode, and a second position for an anti-lock mode of operation to isolate its related wheel brake from the master cylinder supply line and direct brake fluid along a related by-pass flow path and thus reduce pressure of the braking fluid to its related wheel brake;

c. maintaining said control valves in the first position, and in response to a skid condition of either or both of said wheels, moving a control valve of a wheel in the skid condition to the second position to cause flow from the related wheel brake to be directed to a related one of first and second by-pass valves which open from a first position blocking by-pass flow in a normal operating mode to a second position to permit by-pass flow in an anti-lock mode;

d. in response to said skid condition, operating a pump to receive by-pass flow from said first or second by-pass valve in an anti lock mode and recirculate the by-pass brake fluid in said system;

e. operating a release valve operatively connected to said first and second control valves to direct brake fluid from said first and second control valves to said master cylinder, in a manner that said release valve is made responsive to fluid pressure levels of said first and second control valves, so as to be movable between first and second position, in a manner that with said first control valve in its anti-lock mode and being at a lower pressure relative to said second control valve, said release valve is in the first position to be able to connect said first control valve to the master cylinder to isolate said second control valve from said master cylinder and with said second control valve in its anti-lock mode and being at a lower pressure relative to said first control valve, said release valve is in the second position to be able to connect the second control valve to the master cylinder to isolate said first control valve from said master cylinder
where by with one of said control valves in its anti-lock mode, and the other said control valve in its normal operating mode, said pump delivers brake fluid toward the other control valve which is isolated by said release valve from transmitting pump pressure pulses back to said brake cylinder.

* * * * *